Feb. 28, 1956 — S. P. BEDINGFIELD — 2,736,383

OIL WELL TESTING TOOL

Filed March 31, 1951 — 3 Sheets-Sheet 1

INVENTOR.
STERLING P. BEDINGFIELD
BY
ATTORNEY

Feb. 28, 1956  S. P. BEDINGFIELD  2,736,383
OIL WELL TESTING TOOL
Filed March 31, 1951  3 Sheets-Sheet 2

INVENTOR.
STERLING P. BEDINGFIELD
BY Edw. S. Newton
ATTORNEY

Feb. 28, 1956
S. P. BEDINGFIELD
2,736,383
OIL WELL TESTING TOOL
Filed March 31, 1951
3 Sheets-Sheet 3
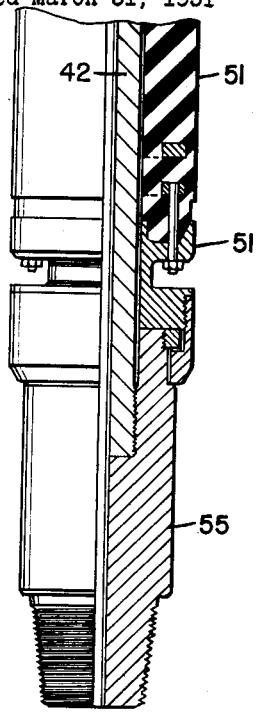
FIG. 8
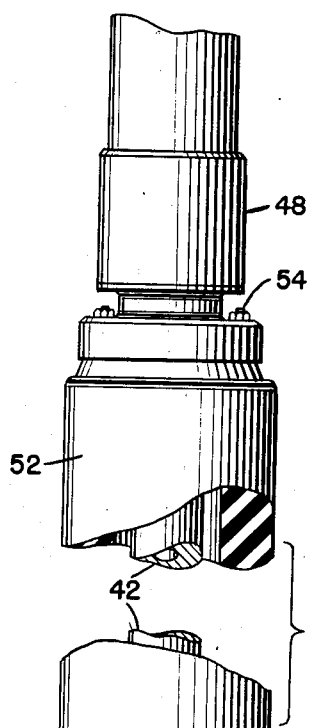
FIG. 9
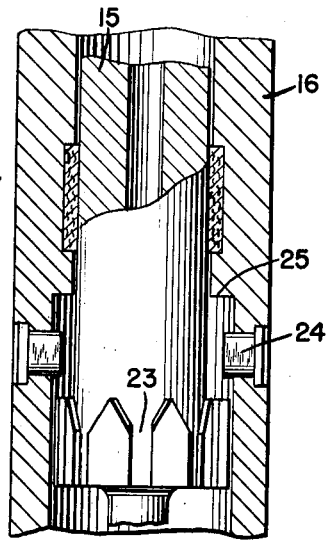
FIG. 10
INVENTOR.
STERLING P. BEDINGFIELD
BY 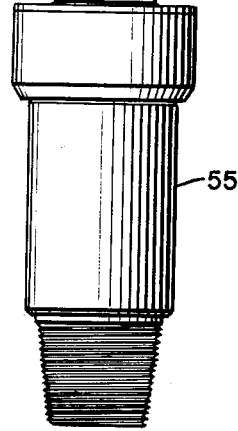
ATTORNEY

United States Patent Office 2,736,383
Patented Feb. 28, 1956

2,736,383

OIL WELL TESTING TOOL

Sterling P. Bedingfield, Bossier City, La.

Application March 31, 1951, Serial No. 218,593

5 Claims. (Cl. 166—188)

My invention relates to an oil well testing tool generally, and more particularly the type commonly known as a formation testing tool, which is adapted to be lowered into the drilled hole before any casing is set to determine, as a preliminary test, whether the well is producing oil or salt water and in what proportions; and also determine the amount of gas pressure emitted by the formation at the depth calculated to produce oil.

In former methods it has been customary to make such a test by using two separate tools, one for trapping a sample of the fluid produced by the formation so that it may be brought to the surface for an analysis, and the other for lowering into the hole to check the amount of pressure produced by the formation. While certain prior art devices have attempted to combine these operations, none have been entirely successful in that the packer member is usually dislodged from the formation when the necessary movement is made to the pipe string for closing the pressure valve. The actual pressure is recorded on a prior art instrument concealed in the bottom of the testing tools, where some provision must be made to close off the pressure from entering the pipe string through the tool and direct it toward the recording device. It has been left to the present invention to provide a device in which the valve between the formation and the collecting tubing string is closed off by simply rotating the upper pipe string without causing any strain or movement of the packer member previously expanded against the side walls of the drilled hole.

It is an object of the present invention to provide a formation testing tool adapted for lowering into the drilled hole of a well whereby a sample of the well's production may be taken and whereby the bottom hole pressure of the wall may be recorded.

It is another object of the invention to provide such a tool wherein both tests may be made with a single "run" of the tool into the hole.

It is another object of the invention to provide an open-hole testing tool including a packer member adapted to be expanded against the side walls of the formation to relieve the static pressure of a drilling mud placed in the hole so that the pressure from the actual producing formation may force its productive fluid into the pipe string supporting the tool; and wherein this flow may be shut off for recording the bottom hole pressure without releasing the packer member from its set position.

It is a further object of the invention to provide a novel closing valve for such a tool which may be actuated to close by rotating the entire upper pipe string without imparting rotation to the packer member and the portions of the tool positioned beneath the packer member.

Another object of the invention is to provide an oil well testing tool which may be used as a complete unit for accomplishing the above mentioned tests, or which may have its several assemblies disjoined for connection to other prior art tools and assemblies for use in other tests.

Another object of the invention is to provide a testing tool for oil wells which is relatively simple in its manufacture and operation, and wherein the several component parts and assemblies may be readily disjoined for cleaning and repair.

Other objects and advantages of the invention will become apparent in the course of the following detailed description when viewed together with the accompanying drawing in which:

Figs. 3, 5 and 8 are, respectively, broken cross-sectional views of the upper, center, and lower portions of the tool.

Fig. 9 is a broken, detail view of the lower end of the tool.

Fig. 10 is a cross-sectional detail view showing the mode of locking an inner mandrel to its outer housing member.

Figure 3:
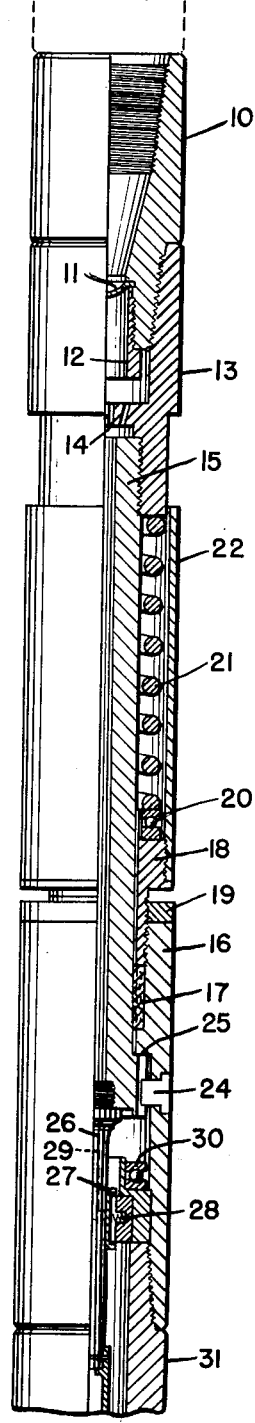

In the drawing, numeral 10 designates an upper connector provided with internal threads by means of which the tool is threadedly attached for support by a string of drill pipe for lowering into the well. Inside the upper connector 10, I have provided a thin metallic disc 11, held in position by a hollow retaining screw 12, and for the purpose as will be described later in the specification.

Threaded onto the lower end of the upper connector 10 is mandrel head 13 having an inner partition wall provided with a multiplicity of holes 14. The mandrel head is threadedly attached to the upper end of a hollow mandrel 15. The mandrel is extended into the upper end of a sliding valve body 16 which is provided with a set of packing 17, a suitable packing nut 18 and a locknut 19. Embracing the mandrel just above the packing nut 18 is a thrust bearing 20, receiving the thrust of a compression spring 21 positioned between the bearing and the lower end of the mandrel head 13. The spring is encased in a shell 22 serving as a guard to prevent excessive foreign matter from collecting against both the spring and the bearing.

The lower end of the mandrel is provided with an enlarged head constructed in the manner illustrated in Fig. 10 which shows the head provided with an equal number of keyways 23, any opposite two of which are arranged to coact with corresponding keys 24 positioned in the sidewall of the sliding valve body 16 to prevent the mandrel from turning; the upper face of the head, of course, resting against the stop 25 in the valve body. In Fig. 10, the mandrel 15 is shown as being moved downwardly so that the keyways 23 are completely disengaged from the keys 24 so as to permit the mandrel to be completely rotated without disturbing the lower portion of the tool, a feature which will be discussed at length later in the specification. It will be noted that the upper sides of the keyways are beveled sharply so that when the mandrel is again moved upwardly, it will readily slide into a keyed position without undue rotation of the mandrel.

Affixed to the lower end of the mandrel is a sliding valve mechanism, fully described in U. S. Patent No.

Figure 4:
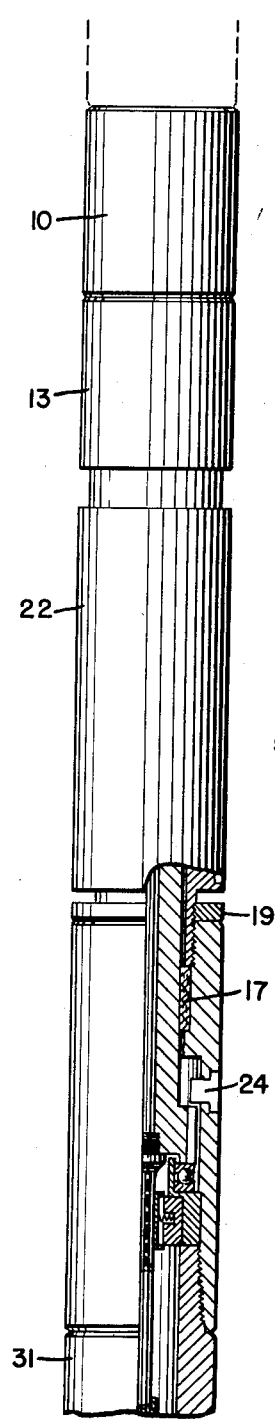
Fig. 4 is a broken part cross-sectional view of Fig. 3, and illustrates one of the internally positioned valves in the open position.

2,326,867, which consists briefly of a valve stem 26 having two flat sides, ground smooth and coacting with a pair of valve plates 27 urged against the flat surfaces of the stem by springs 28. The stem 26 is provided with a bore 29 communicating with the hollow mandrel and turned outwardly beneath the valve plates in such a manner that if fluid is pumped down the tubing string, the force will open the flat plates against their springs 28 and allow the fluid to flow through the tool, yet will close upon any tendency of the fluid to flow in the reverse manner. However, when the exit holes in the valve stem are moved from beneath the plates 27, fluid may be pumped in either direction through the stem. In the mechanism I have provided a thrust bearing 30 adapted to be engaged by the lower head of the mandrel so that the upper string of pipe might bear directly against the bearing as it is being rotated without imparting undue thrust against the more delicate mechanisms inside the tool. Fig. 3 shows the above mentioned valve in the closed position, while Fig. 4 shows the stem 26 lowered to open the valve for two-way circulation.

Figure 6:
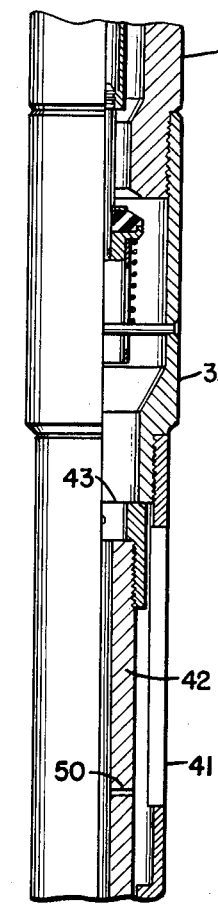
Fig. 6 is a broken, part cross-sectional view illustrating a movement of the components shown in Fig. 5.
Figure 7:
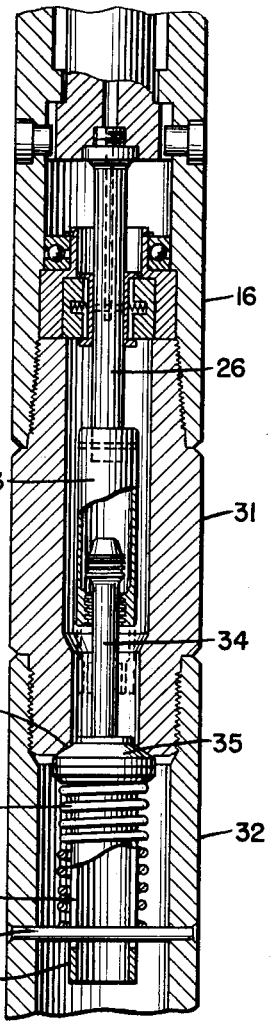
Fig. 7 is a detailed, cross-sectional view through a portion of the tool showing the elements embodying the valve used for recording the bottom hole pressure.

Numeral 31 designates an intermediate sub interposed between an upper and a lower valve structure, the construction of the lower valve arrangement being more clearly illustrated in Fig. 7 of the drawing. In this figure, I have shown a hollow tube 33 pinned to the lower end of the valve stem 26 and adapted to be rotated therewith. The lower end of the tube is provided with internal threads engageable with threads provided on the upper end of the closing valve stem 34. This stem is further provided with a removable valve 35, preferably made as a hard rubber ring, and adapted to be seated against a valve seat 36 formed in the lower inner end of the intermediate sub 31. The lower end of the stem constitutes a hollow shell 37 provided with elongated slots 38 in the side walls thereof. Through these slots I have extended a pin 39 having its opposite ends anchored in the side walls of the lower valve body 32. Embracing the shell 37 is a compression spring 40 placed between the pin 39 and the back side of the valve ring 35 and normally urging the ring into a closed position aginst the seat 36. Now it can be seen that if the upper end of the valve stem 34 were engaged with the threads of the tube 33, the spring would necessarily have to be compressed to hold the valve 35 open in the manner illustrated in Figs. 5 and 6; but if the tube 33 is rotated in the proper direction, as by turning the upper string of pipe, the stem 34 will assume the position illustrated in Fig. 7 to close off all flow through the tool.

Figure 5:
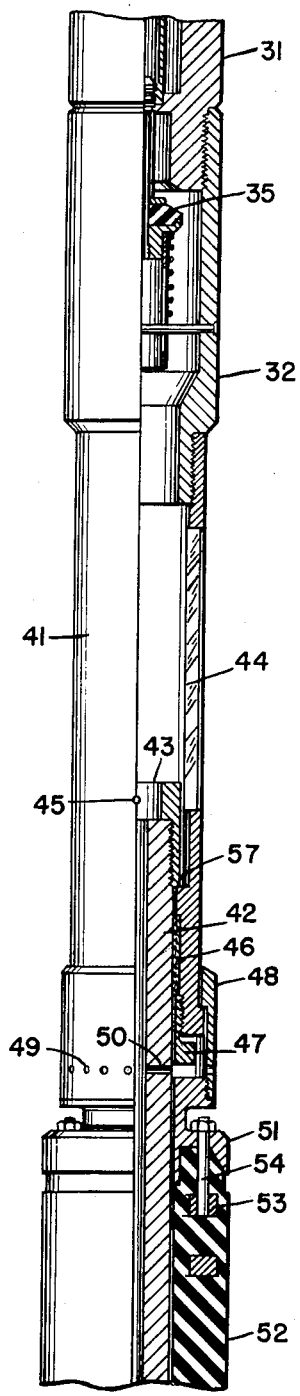

The lower valve body 32 is threaded at its lower end to engage the upper end of a mandrel housing 41 of the "packer" end of the tool. Inside the mandrel housing 41 is a mandrel 42 having an upper head member 43 provided with keyways engaged with keys 44 set into the side walls of the housing, so as to permit the mandrel to be moved from the normal down position as shown in Fig. 5 to an upper position illustrated in Fig. 6. To keep the mandrel in the down position, I have provided a shear pin 45 which prevents the collapse of the tool when entering the hole, yet which is easily sheared off for operation of the tool by setting the weight of the upper pipe string upon it after the tool is set on the bottom. It will be noted also in Fig. 5 that this mandrel 42 is positioned through a set of packing 46 secured by a packing nut 47, and that the balance of the weight below the upper mandrel housing 41 is carried by a free turning slip collar 48. The slip collar 48 is provided with inlet holes 49 which are in direct communication with inlet holes 59 in the mandrel only when the same is in the down position as shown in Fig. 5.

The slip collar 48 supports a packer head 51, one end of which is affixed to each end of a packer rubber 52. Molded into the ends of the packer rubber 52 are spider rings 53 provided with circumferentially spaced bolts 54 adapted to be positioned through corresponding holes in their respective heads and bolted thereto. These spider rings 53 not only serve as a means for attaching the packer rubber to the heads but also reinforce the rubber ends to keep them from splitting or otherwise becoming frayed and torn when the runner is expanded against the side walls of a formation.

The lower end of the mandrel 42 threadedly engages a bottom sub 55 also provided with the same construction for attachment to the packer rubber as disclosed on the top end. The external threads shown on the lower end of the bottom sub 55 are adapted for engagement with any desired length of tail pipe so that the tool might be set for actuation at any given distance from the actual bottom of the well hole.

As for the operation of the tool, let it be assumed that it is desired to test the production of oil in a drilled well hole before the casing has been set therein. Any desired length of perforated tail pipe 56 is made up to position the packer rubber member 52 above the bottom of the hole so that when expanded against the formation walls, the rubber will close off all flow of the oil coming from the oil producing sand into the hole, except as permitted to enter the testing tool as will now be described.

Figures 1, 2:
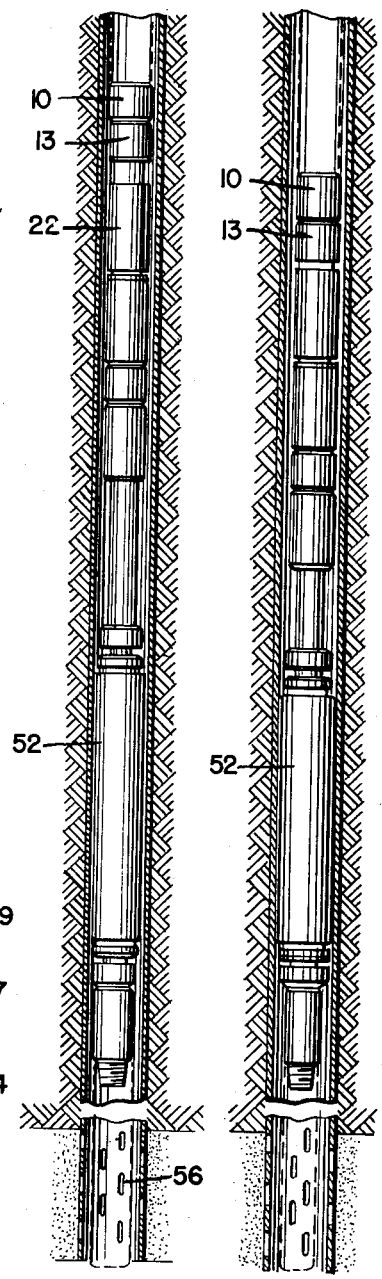
Fig. 1 is a cross-sectional view showing my invention in a testing tool as being lowered into a well hole, the tool being shown in an inoperative position.
Fig. 2 is a cross-sectional view similar to that of Fig. 1 but showing the tool in an operative position.

By attaching lengths of drill pipe to the top of the tool as formerly stated, the tool is then lowered into the well hole in the manner shown in Fig. 1. Since the tool is to finally record the bottom hole pressure, such instrument is positioned in the tail pipe when the tool is at the well surface, and arranged in the prior art manner for testing the sub-surface pressure. It will be remembered that the drilled hole at this time contains a quantity of drilling mud, the weight of which prohibits the escape of gas collecting at the bottom of the well. Upon entering the hole, the inner components of the tool will assume the positions as shown in Figs. 3, 5 and 8 which represent continuous, broken views of the entire tool in the entering or "set" position.

The bottom length of tail pipe is usually provided with a head member or rounded nose which eventually strikes the bottom of the hole and the tool is now ready for setting. It will be remembered that upon entering the hole, the drilling mud may enter the tool through the aligned holes 49 and 50 at the top of the packer member, but the mud cannot pass upwardly through the tool due to the normally closed sliding valve of my former patent. By lowering the weight of the upper string of pipe from the surface, the small shear pin 45 is sheared off and the packer mandrel 42 assumes the position as shown in Fig. 6, thus expanding the rubber 52 against the side walls of the formation as shown in Fig. 2, and raising the inlet holes 50 in the packer mandrel well above the packing 46 so that the drilling mud from the hole is cut off from entering the tool altogether. In this position all of the weight of the drilling mud is taken off the formation so that the pressure from the formation may be directed upwardly through the tool.

It will be remembered that the metal disc 11 is used as a precautionary measure to prevent fluid or gas from being blown upwardly through the tool. To open the disc, which is usually made of aluminum or other material, a small weight is dropped down through the tool where it strikes the disc and breaks it, allowing the fluid, subsequently entering the tool, to flow through the holes 14 provided for that purpose.

Since the oil from the producing formation cannot get by the expanded packer rubber 52, it is forced by static pressure through the perforated tail pipe and into the bottom of the tool, where it travels upwardly, pushing the trapped drilling mud ahead of it until it is finally stopped by the valve plates 28 on my patented sliding valve. By lowering the upper pipe string still further, the spring 21 is compressed, and the sliding valve is opened to permit fluid from the formation to enter and collect in the upper string of drill pipe. The pressure from the formation forces the fluid to the surface where an analysis of its content is made to determine the amount of actual oil present.

To close off this flow for checking the bottom hole pressure, it is only necessary to rotate the upper pipe string. It will be remembered that in the open position, the mandrel 15 is lowered and is resting upon the thrust bearing 30, with the mandrel completely disconnected from its housing 41. When the upper pipe string is rotated to the right, the valve stem 26, together with its tubular shell 37, is also rotated, causing the stem 34 of the closing valve to be drawn upwardly by its upper threaded end. When the threaded end of the stem 34 has been completely passed through the threaded portion of the shell, the compression spring 40 snaps the closing valve 35 against the seat 36, thus closing off all flow from the formation through the tool. The tool is left in this position for as many hours as desired so that fluctuations of formation pressure may be recorded over a period of time and later posted as part of the well's case history.

It is well to note that in the above description of actuating the closing valve, the packer member 52 is not disturbed from its expanded position against the walls of the formation, and is not jarred or otherwise loosened which might give a false reading of the bottom-hole pressure.

To remove the tool from the well, the upper pipe string is lifted, which first releases the main compression spring 21, allowing the mandrel 15 to move upwardly and close the sliding valve. Such movement further engages the keys 24 with a pair of the key slots 23 which are closest thereto and thereby relocks the mandrel to the housing 16. Upon further lifting the string, the packer mandrel housing 41 moves upwardly until the head 43 of the packer mandrel 42 abuts a shoulder 57 inside the housing. The packer rubber member 52 is now completely disengaged from the side walls of the formation and the tool may be withdrawn. Should the packer rubber become stuck or otherwise lodged against the walls of the hole, it may be rotated and broken loose by simply rotating the pipe string. It will also be noted that when the packer mandrel 42 is lowered again to the position of Fig. 5, the holes 50 therein are brought into alignment with the holes 49 in the slip collar 48 and pressure exerted by the outer drilling mud is made to assist in breaking the rubber from its lodged position against the sides of the well hole.

After completing the test, the tool is withdrawn by continued lifting and disjoining the lengths of the pipe string supporting it. As soon as the packer rubber member 52 is collapsed, the weight of the drilling mud is again put on the formation to render it inactive until further tests can be made or the well set up for actual production.

As seen from the foregoing description of the construction and operation, it will be apparent to those skilled in the art that my invention in a formation testing tool may be used with considerable advantage over any now known or used in the prior art. While I have shown the tool in its entire assembly, it will be understood that the tool may be disjoined to use only the packer assembly, the upper sliding valve assembly, the rotating closing valve assembly, or any combination thereof either together or with other prior art tools to make formation or other tests as demanded by the conditions of the well.

Various changes, adaptations and modifications may be made without departing from the scope of my invention as defined in the following claims.

I claim:

1. An oil well testing tool comprising a series of threadably joined tubular sleeves, a hollow mandrel having the upper end thereof arranged for threaded attachment to a string of drill pipe or the like, a portion of the lower end of said mandrel being enclosed in the upper end of said joined tubular sleeves, said mandrel being further provided with locking means between the same and the side walls of the sleeve enclosing it, said mandrel being unlocked from said sleeve by lowering the pipe string to which said mandrel is attached to permit both longitudinal and rotative movements of said mandrel independently of said joined tubular sleeves, a valve for stopping fluid flow upwardly through said tubular sleeves, said valve including a valve stem connectable with said mandrel and movable longitudinally therewith, an annular valve seat formed on an end of one of said sleeves, means for locking said valve stem against rotative movement relative to said sleeves but permitting longitudinal movement thereof with the mandrel to which the same is attached, and means for closing said valve against said valve seat operable upon rotating said mandrel when the same is in an unlocked position to disconnect it from the valve stem.

2. An oil well testing tool comprising a hollow body portion consisting in a series of joined tubular sleeves, a hollow mandrel having its lower end positioned in the upper end of said series of tubular sleeves and arranged for further telescopic movement thereinto when lowered by the pipe string to which it is attached, means for locking said mandrel against rotative movement relative to said sleeves when the same is in the up position and freeing the same for rotative movement independently of said tubular sleeves when the same is telescoped to a down position, a valve structure operated by said mandrel for closing off fluid flow upwardly through the same, said valve structure comprising an internally threaded socket member carried by said mandrel, a valve seat formed on the end of one of said sleeves, a valve stem having its upper end threadably engageable with said threaded socket member, a valve carried by said valve stem, means holding said valve and stem against rotative movement with respect to said hollow body but permitting longitudinal movement, a compression spring normally urging said valve into engagement with said annular valve seat, said stem and socket being disengageable by rotating said mandrel to permit said compression spring to force said valve into a closed position.

3. An oil well testing tool comprising a series of threadedly joined tubular sleeves, a hollow mandrel positioned for telescopic movement in the upper end of said sleeves, a collar on the upper end of said mandrel for threadedly attaching the same to a length of drill pipe, an enlarged head on the lower end of said mandrel and an internal shoulder provided in one end of said sleeves, a compression spring encircling said mandrel and arranged to normally urge the head of said mandrel against said shoulder, a series of keyways cut longitudinally and circumferentially around said mandrel head, a pair of keys positioned through the side walls of one of said sleeves near said shoulder, said keys and keyways cooperating to prevent rotation of said mandrel while being held in engagement in the "up" position by said spring, an upper valve structure operable by said mandrel to permit fluid flow in either direction when said mandrel is in the "down" position and to permit fluid flow only in the downward direction when the mandrel is in the "up" position, a lower poppet valve structure comprising a valve stem threadedly connected to said mandrel, a poppet valve affixed to said stem, a valve seat formed on one of said sleeves, spring means normally urging said poppet valve toward said seat, means for permitting only longitudinal movement of said valve stem and said valve, said valve being operable to close against said seat only when said mandrel is in the "down" position and rotated to disengage the same from said valve stem.

4. In an oil well testing tool of the class described having an outer body composed of a series of threadedly joined tubular sleeves and a mandrel positioned for both telescopic and rotative movement in said body, a valve operable by said mandrel for closing off all fluid flow upwardly through said tool, said valve comprising a valve stem threadedly engaged with said mandrel and movable only longitudinally therewith, a valve formed on said stem, an annular valve seat formed on the lower end of one of said sleeves, spring means normally urging said valve toward a closed position against said seat, said valve being operable to close only when said mandrel is rotated to disengage the same from said threaded stem.

5. In an oil well testing tool comprising a hollow body, a mandrel having its upper end arranged for attachment to a string of pipe and its lower end arranged for telescopic movement in an upper portion of said hollow body, spring means normally urging said mandrel to the "up" position, a poppet valve operable by said mandrel, said poppet valve comprising a valve stem threadedly joined to said mandrel and arranged only for longitudinal movement therewith, a valve head on said stem, an annular valve seat formed in said hollow body, a compression spring beneath said valve head normally urging the same into a closed position against said seat, said poppet valve being operable to close upon rotation of said mandrel while in its "down" position to disengage the same from said threaded valve stem.

References Cited in the file of this patent

UNITED STATES PATENTS

| | | |
|---|---|---|
| 2,073,107 | Johnston | Mar. 9, 1937 |
| 2,124,766 | Cox | July 26, 1938 |
| 2,189,919 | Moore | Feb. 13, 1940 |
| 2,326,867 | Kinney | Aug. 17, 1943 |
| 2,329,939 | Phipps | Sept. 21, 1943 |
| 2,375,972 | Wood et al. | May 15, 1945 |